(12) United States Patent
Hreggvidsson

(10) Patent No.: US 11,732,213 B2
(45) Date of Patent: Aug. 22, 2023

(54) WINTERIZATION OF FISH OIL

(71) Applicant: MARGILDI EHF, Mosfellsbaer (IS)

(72) Inventor: Snorri Hreggvidsson, Mosfellsbaer (IS)

(73) Assignee: MARGILDI EHF, Mosfellsbaer (IS)

( * ) Notice: Subject to any disclaimer, the term of this patent is extended or adjusted under 35 U.S.C. 154(b) by 0 days.

(21) Appl. No.: 15/573,278

(22) PCT Filed: May 13, 2016

(86) PCT No.: PCT/IS2016/050009
§ 371 (c)(1),
(2) Date: Nov. 10, 2017

(87) PCT Pub. No.: WO2017/009874
PCT Pub. Date: Jan. 19, 2017

(65) Prior Publication Data
US 2018/0155652 A1    Jun. 7, 2018

(30) Foreign Application Priority Data

May 13, 2015    (IS) .......................................... 050107

(51) Int. Cl.
| | | |
|---|---|---|
| *C11B 3/00* | (2006.01) | |
| *C11B 7/00* | (2006.01) | |
| *A23L 29/00* | (2016.01) | |
| *A23L 33/115* | (2016.01) | |
| *A23L 33/12* | (2016.01) | |

(52) U.S. Cl.
CPC .............. *C11B 3/008* (2013.01); *A23L 29/04* (2016.08); *A23L 33/115* (2016.08); *A23L 33/12* (2016.08); *C11B 7/0075* (2013.01); *C11B 7/0083* (2013.01); *A23V 2002/00* (2013.01);
(Continued)

(58) Field of Classification Search
CPC ...... C11B 3/008; C11B 7/0075; C11B 7/0083
See application file for complete search history.

(56) References Cited

U.S. PATENT DOCUMENTS

| | | | |
|---|---|---|---|
| 2,435,626 A | | 2/1948 | Gooding et al. |
| 2,520,801 A | * | 8/1950 | Gee ....................... C11B 7/0008 |
| | | | 554/185 |

(Continued)

FOREIGN PATENT DOCUMENTS

| | | | | |
|---|---|---|---|---|
| EP | 0249282 A1 | * | 12/1987 | ............. A23D 7/001 |
| EP | 0651046 A1 | | 5/1995 | |
| GB | 555570 A | | 8/1943 | |

OTHER PUBLICATIONS

Cordain, "The Paleo Diet", published at least on Feb. 9, 2013, retrieved from the Internet <URL: https://web.archive.org/web/20130209042045/https://thepaleodiet.com/polyunsaturated-fatty-acids/ >.*

(Continued)

*Primary Examiner* — Changqing Li
(74) *Attorney, Agent, or Firm* — Heslin Rothenberg Farley & Mesiti P.C.

(57) ABSTRACT

The present invention relates to a process for winterizing crude fish oil by an improved winterization process, wherein a solubilizing agent is added to the fish oil prior to the winterization. The solubilizing agent is preferably a fat-soluble edible organic compound, such as fatty acids or fatty acid mixtures. The invention further relates to compositions obtainable by the process.

15 Claims, 14 Drawing Sheets

(52) U.S. Cl.
CPC . *A23V 2250/188* (2013.01); *A23V 2250/1876* (2013.01); *A23V 2250/194* (2013.01)

(56) References Cited

U.S. PATENT DOCUMENTS

| | | | | |
|---|---|---|---|---|
| 4,792,418 | A | * 12/1988 | Rubin | C09F 5/10 554/174 |
| 6,492,537 | B2 | * 12/2002 | Foglia | C11B 7/0016 426/429 |
| 2016/0017257 | A1 | * 1/2016 | Byelashov | A23D 9/04 554/209 |

OTHER PUBLICATIONS

Hui, Bailey's Industrial Oil and Fat Products, 1995, Wiley-Interscience, 5th edition, vol. 4, pp. 333.*

Vegetable Oils Summary, retrieved Jan. 30, 2019, retrieved from the Internet <URL: https://www.vaughns-1-pagers.com/food/vegetable-oils.htm>.*

Anonymous, "PikePro Winterized Bait Oils", Fishingmegastore. com, As listed on International Search report, "Jan. 9, 2013 (Jan. 9, 2013), pp. 1-2, XP002762700, Retrieved from the Internet: URL:http:www.fishingmegastore.com/pikepro-winterized-bait-oils~11733.html [retrieved on Oct. 10, 2016], the whole document".

Iklil Fuadi et al., "Characterization of Fish Oil from Mackerel (Scomber japonicus) Canning by Product", Asian Journal of Agriculture and Food Science, vol. 2 Issue 3, Jun. 1, 2014, pp. 227-232.

International Search Report and Written Opinion for PCT/IS2016/050009, dated Oct. 21, 2016.

* cited by examiner

Crystallisation steps

| No | Temperature Water | | Duration Step | | Temperature Oil | |
|---|---|---|---|---|---|---|
| 1 | 24.0 | °C | 2 | mn | 28.0 | °C |
| 2 | 19.0 | °C | 2 | mn | 22.0 | °C |
| 3 | 15.0 | °C | 120 | mn | 18.0 | °C |
| 4 | 13.0 | °C | 60 | mn | 15.0 | °C |
| 5 | 12.0 | °C | 20 | mn | 14.0 | °C |
| 6 | 7.0 | °C | 5 | mn | 11.0 | °C |
| 7 | 4.0 | °C | 5 | mn | 7.0 | °C |
| 8 | 4.0 | °C | 5 | mn | 7.0 | °C |
| 9 | 4.0 | °C | 5 | mn | 7.0 | °C |
| 10 | 4.0 | °C | 5 | mn | 7.0 | °C |

FIG. 14

WINTERIZATION OF FISH OIL

CROSS REFERENCE TO RELATED APPLICATIONS

This application is a U.S. National Phase filing under 35 U.S.C. § 371 of International Application PCT/IS2016/050009, filed May 13, 2016, and published as WO 2017/009874 A1 on Jan. 19, 2017. PCT/IS2016/050009 claims priority from Icelandic application number 050107, filed May 13, 2015. The entire contents of each of these applications are hereby incorporated herein by reference.

The present invention relates to a process for purifying fatty acid oil for human consumption that is obtainable from fish, especially fatty fish.

Omega-3 fatty acids are long-chain polyunsaturated fatty acids ranging from 18 to 22 carbon atoms in chain length with the first of many double bonds beginning at the third carbon, counting from the methyl end of the fatty acid structure. These fatty acids, especially docosahexaenoic acid (DHA, having 22 carbon atoms with 6 double bonds) and eicosapentaenoic acid (EPA, with 20 carbon atoms and 5 double bonds) are believed to have beneficial health effects.

The American Heart Association recommends that everyone eat fish, particularly fatty, coldwater fish, at least twice a week, which is believed to help prevent heart disease and stroke. Such fish, including salmon, mackerel, herring, sardines, lake trout, and tuna are especially high in omega-3 fatty acids. Fish oil that is rich in omega-3 fatty acids can be obtained by eating fish or by taking fish oil supplements. The fatty fish in general provide about 1 gram of omega-3 fatty acids for each 100 g of fish.

Crude fish oil needs to be purified prior to human consumption. Winterization, which is one type of a dry fractionation, is a process for removing undesirable high melting point parts of oil, frequently referred to as stearin, such as waxes, certain triglycerides etc., by slowly cooling and filtering an oil, such that unwanted fats form crystals and precipitate from the oil. Two fractions are obtained in the winterization process, a soluble "olein" fraction and a crystalline "stearin" fraction. The latter is typically removed by filtration techniques. It is known that organic solvents can be used in such methods, either for extracting contaminants or for extracting the desirable components of the oil, usually particular fatty acids. The drawback of such methods is that for human consumption, the organic solvent must be completely removed prior to use. Further, certain solvents are not allowable for the preparation of human food products.

It is thus preferable to perform the winterization on the oil as is, i.e. without adding organic solvents. Oils from certain sources, such as fatty fish, is high in long-chain fatty acids, especially monounsaturated fatty acids, that have a relatively high melting point, and precipitate out of solution during the winterization process. In particular, saturated fatty acids and 20:1 and 22:1 unsaturated fatty acids are problematic during winterization of oil from fatty fish. Inevitably, such precipitates also include other fatty acid components of the oil, including desirable fatty acids such as omega-3 fatty acids. As a consequence, winterization as currently performed is not feasible for purifying oil from sources that are rich in long-chain fatty acids, in particular saturated and/or monounsaturated long chain fatty acids.

WO 03/049832 describes a method for the extraction and purification of lipids from oilseed and microbial oil. In this process, a lipid composition that has at least one long chain polyunsaturated fatty acid is mixed with a polar solvent that is chosen such that contaminants are less soluble in the solvent than in the long chain polyunsaturated fatty acid. The process is typically conducted at cool temperatures.

U.S. Pat. No. 8,828,447 discloses a process for the isolation of phopholipids and producing a fraction from fish oil that is rich in polyunsaturated fatty acids. The process comprises steps of mixing fish oil with a polar solvent, centrifuging the mixture to separate a polar fraction from the lipid fraction, and isolating a phospholipid or a polyunsaturated fatty acid from the polar fraction.

WO 02/10322 describes a process for preparing mixtures of omega-6 and omega-3 fatty acids, that are subsequently purified by acid/alkali treatment, bleaching, deodorization, filtration, polishing or cooling, and used as foodstuff additives. The purification removes trace metals, pigments, carbohydrates, proteins, sulfur, sterols, and mono- or diglycerides from the oil, rendering the oil suitable for human consumption.

BRIEF DESCRIPTION OF THE DRAWINGS

FIG. 14 shows a picture of a control panel indicating typical cooling steps for crystallization.

DETAILED DESCRIPTION

Figure 1:
FIG. 1 shows samples of crude herring oil (No. 1, on the right), crude herring oil mixed with 50% of a solubilizing agent (No. 2, on the left), and crude herring oil mixed with 35% of solubilizing agent (No. 3, middle).

The present invention provides a method of winterizing fish oil for human consumption that is not feasible to purify by conventional winterization protocols. In the present context "crude oil" refers to an oil that is obtained by extraction from fish, and requires winterization steps to remove fatty or fat-soluble impurities, such as long-chain fatty acids. The method in one aspect includes steps of (a) mixing a fish oil with a solubilizing agent, so as to obtain an oil mixture, and (b) performing winterization on the oil mixture. The winterization can be performed by successive steps of incubating and filtering the oil mixture at increasingly lower temperatures, collecting the filtrate after each filtration step, and use the filtrate in subsequent steps of incubation and filtering at increasingly lower temperatures. The solubilizing agent can preferably be an edible, fat-soluble organic compound or mixture of compounds that has a melting point that is lower than the temperature of the last filtering step. In some embodiments, the process can comprise a single step of incubating and filtering.

The crude fish oil can have a high stearin content. The stearin content can be in the range of about 15% to about 40% (w/w), such as about 15% to about 35% (w/w), about 15% to about 30%, about 15% to about 25%, about 20% to about 30% (w/w).

During this process the oil mixture can be incubated at a certain temperature, and subsequently filtered at that temperature. The resulting filtrate is consequently cooled to a lower temperature, incubated at that temperature, and then filtered. These steps are repeated, until an oil is obtained that remains clear when incubated at a low temperature. Commonly, a winterized oil that is to be used for human consumption is considered to be adequately winterized when it remains clear after incubation for at least 3 hours at 0° C. Accordingly, it can be beneficial to conduct the last step of incubation and filtering of the winterization at a temperature that is close to or lower than 0° C. Accordingly, in some embodiments, the temperature in the last filtering step is in the range of about −10° C. to about +5° C. In certain embodiments, the temperature in the last filtering step is in a range of about −10° C. to about +8° C., in a range of about −10° C. to about +7° C., in a range of about +10° C. to about +5° C., in a range of about −10° C. to about +2° C., in a range of about −5° C. to about +2° C., in a range of about −5° C. to about +1° C., in a range of about −4° C. to about 0° C., or in a range of about −2° C. to about 0° C.

The process can include a suitable number of steps of incubating and filtering for achieving the end result of a clear fish oil that remains clear after incubation of preferably 3 hours or more at or near 0° C. Thus in some embodiments, the process includes from 1 to 10 steps, wherein the temperature in each step in the process is lower than the temperature of the previous step. In other embodiments, the process includes e.g. from 2 to 8 steps, from 3 to 8 steps, from 3 to 6 steps, from 3 to 5 steps, or 3 to 4 steps. The temperature difference between steps can suitably be from 1 to 10° C., from 1 to 5° C., such as 1 to 4° C., 1 to 3° C., 2 to 4° C., 2 to 3° C. or 1 to 2° C. In some embodiments, the temperature differences between steps is about 1° C. The temperature difference between steps in the method may be equal, or it can be variable. For example, in some embodiments, the temperature difference between the last two steps in the method may be smaller than between previous steps in the method.

The incubation step of the process facilitates formation of crystalline precipitates of undesirable components of the oil mixture, which is subsequently removed by filtration. The incubation step can be suitably performed for a time that ranges from a few minutes to several hours, or even up to 24 hours or more. In certain embodiments, incubation is performed for e.g. 5 to 120 minutes, such as from 10 to 90 minutes, 15 to 60 minutes, 20 to 50 minutes, or 30 to 40 minutes.

Filtration is performed using filters and filtering devices that are known in the art. For example, filtration can be done using a Buchner funnel, and can be filtered through membranes with pore size that is in the range from about 1 micron to about 200 micron, e.g., from about 1 micron to about 200 micron. In some embodiments, membranes with pore size that is in the range of 50 to 100 micron, in the range of 10 to 50 micron, in the range of 10 to 30 micron, or in the range of 10 to 20 micron are used. It may be beneficial to use filters with larger pore size in the first step of the process, and change filter type to filters with lower pore size as the temperature is lowered. Accordingly, in some embodiments, different pore size membranes are used in the different steps of the method. For example, a filter with 30 micron pore size may be used in the first step, and filters with 20 micron pore size or 10 micron pore size, be used in subsequent steps of the process.

It can be beneficial to perform of filtration at a temperature that is very close to, or slightly lower than, the temperature of the previous incubation step in the method.

Accordingly, in certain embodiments, the successive steps of incubating and filtering can comprise steps of (c) incubating the oil mixture at a first temperature that is in a range from +5° C. to +15° C.; (d) filtering the mixture at a second temperature that is equal to or lower than the first temperature; (e) incubating the filtrate obtained in step d) at a third temperature that is lower than the first and second temperature; (f) filtering the mixture from step e) at a fourth temperature that is equal to or lower than the third temperature; and (g) optionally performing additional incubation and filtering steps at increasingly lower temperatures.

In some embodiments, the successive steps of incubating and filtering can comprise steps of (c) incubating the oil mixture at a first temperature that is in a range from +5° C. to +15° C., and filtering the mixture that temperature; (d) incubating the filtrate obtained in step c) at a temperature that is lower than the temperature in step c), followed by filtration at that temperature; (e) filtering the mixture from step d) at a temperature that is equal to the temperature in step followed by filtration at that temperature; and (f) optionally performing additional incubation and filtering steps at increasingly lower temperatures, wherein each incubation and filtration step is performed at the same temperature.

In certain embodiments, the first temperature in the winterization process is in the range from about +7° C. to about +14° C., from about +8° C. to about +13° C., from about +9° C. to about +12° C. or from about +10° C. to about +12° C. The filtering steps in the process can in certain embodiments be performed at a temperature that is between 0 and 2° C. lower than the preceding incubation step, such as 1-2° C. lower, 0-1° C. lower, or about 1° C. lower than the preceding incubation step.

Certain types of fatty fish, such as mackerel, herring, sand eel, sparling (European smelt) and sand eel, are high in desirable omega-3 fatty acids. However, these fish types also contain a high content of fatty acids that promote excessive formation of stearin during winterization. In other words, these fish species have a high stearin content during winterization. As a result, the stearin fraction that is obtained during winterization of these species predominates, leading to co-crystallization of desirable omega-3 fatty acids during winterization which can make it extremely difficult if not impossible to remove the stearin fraction to obtain a pure and soluble olein fraction. These fish species are therefore impossible to purify by conventional winterization methods to obtain a pure fish oil that is free of cloudy precipitates.

The fish oil from these species can have a stearin content that is in the range of about 2% to about 40% (w/w), such as about 2% to about 30% (w/w), such as about 3% to about 20% (w/w), such as about 3% to about 10% (w/w).

These challenges have been recognized in the art, and to date there are no examples of fish oil products from these high-stearin fish species that have been successfully purified by winterization.

The surprising finding by the inventors relates to the addition of a solubilizing agent in the winterization method, which is believed to result in increased solubilization of the desirable components of the fish oil, such as fatty acids, including PUFAs, during the winterization process, during which unwanted components, including saturated and/or long chain fatty acids, precipitate out of the solution. In other words, by addition of the solubilizing agent, the desirable fatty acids that include omega-3 fatty acids, remain in solution during winterization, while the unwanted components form a crystalline precipitate. As a consequence, by the improved winterization method by the inventors, it is now possible to purify fish oil from high-stearin fish species by winterization.

Thus, although winterization methods are known in the art, the present invention provides an improvement that is based on the surprising finding that addition of solubilizing agents prior to winterization can radically improve the solubility of fatty acids during the winterization process.

Accordingly, the invention also provides an improvement, in a method of purifying a non-winterized fish oil, by sequential treatment of incubation and filtering at increasingly decreased temperature, that comprises mixing a solubilizing agent with the fish oil prior to the sequential treatment.

Without intending to be bound by theory, it is believed that the solubilizing agent provides an improved solubilizing milieu for the desirable fatty acid components of the oil. In general, the desirable solubilizing agent has properties of Having a low melting point—i.e. remain in a liquid state during cooling to at least about 0° C., and preferably to at least about −5° C., or to at least about −10° C.

Being acceptable for human or animal consumption

Being fat-soluble

As a consequence, the solubilizing agent can preferably be an organic compound fulfilling the above criteria. The solubilizing agent can for example be a food-grade compound. In the present context, a "food-grade compound" is a compound that has been approved by food administration authorities for use in the production of food items for human consumption. The food-grade compound can therefore be, or include, one or more non-restricted solvent.

The desirable components of the oils to be purified by the method of the invention are certain types of long-chain polyunsaturated fatty acids (PUFAs), such as omega-3 fatty acids and omega-6 fatty acids. As a result, the solubilizing agent should be able to aid in the solubilization of these compounds, while simultaneously allow undesirable components of a crude (non-winterized) oil, such as saturated fatty acids and long-chain unsaturated or monounsaturated fatty acids from precipitating during the winterization process. The stearin fraction that is obtained during winterization is high in these undesirable fatty acids. The solubilizing agent can comprise a mixture of fatty acids. The fatty acids can be free fatty acids, or they can be in the form of triglycerides and/or ethyl esters, or any mixture thereof. The triglycerides and ethyl esters may be simple, i.e. contain a single fatty acid, or they can be mixed, i.e. contain more than one different fatty acid. The solubilizing agent can comprise one or more polyunsaturated fatty acid (PUFA). Examples of desirable PUFAs are omega-3 fatty acids such as docosahexaenoic acid (DHA) and eicosapentaenoic acid (EPA), either as free fatty acids, as ethyl esters or as triglycerides. It is also possible that the solubilizing agent contains one or more type of omega-6 fatty acid, or a mixture of such fatty acids, and such fatty acids can be in the form of free fatty acids, or be provided as a triglyceride or an ethyl ester. The solubilizing agent can also contain monounsaturated fatty acids, either as free fatty acids, as diglycerides or as triglycerides or as mixtures thereof. It should furthermore be appreciated that the solubilizing agent can comprise mixed triglycerides, i.e. triglycerides containing different types of fatty acids. In certain embodiments, the solubilizing agent can further, or alternatively, contain one or more fatty acid selected from e.g. oleic acid, ethyl oleate, elaidic acid, linoleic acid, and stearic acid, or mixtures thereof, squalene, and a sterol, such as phytosterol or tocosterol. In one preferred embodiment, the solubilizing agent comprises ethyl oleate.

The solubilizing agent can further comprise a winterized fish oil. For example, the solubilizing agent can comprise a purified fish oil obtained by the method of the invention. In other words, the method according to the invention can comprise adding a purified fish oil, such as fish oil purified by the winterization method according to the invention, to an unpurified fish oil prior to the winterization.

The solubilizing agent can be added to the fish oil in any suitable amount, so as to obtain an oil mixture that is suitable for winterization. The amount of solubilizing agent is suitably adjusted so that the mixture of solubilizing agent and the desirable components of the crude oil (e.g., omega-3 fatty acids) remain liquid during the winterization process. At the same time, the solubilizing agent should not promote the solubilization of undesirable components in the crude oil, such as saturated or monounsaturated long-chain fatty acids.

In certain embodiments, the ratio of crude oil to solubilizing agent can be in the range of about 10:1 to 1:10 (volume:volume). For example, the ratio can be in the range of about 9:1 to 1:9, in the range of about 8:1 to 1:8, in the range of about 7:1 to 1:7, in the range of about 6:1 to 1:6, in the range of about 5:1 to 1:5, in the range of about 4:1 to 1:4, in the range of about 3:1 to 1:3, in the range of about 2:1 to 1:2, in the range of about 1.5:1 to 1:1.5, or in the range of about 1:1. In some preferred embodiments, the ratio of crude oil to solubilizing agent is in the range of about 5:1 to 1:5, in the range of about 4:1 to 1:4, or in the range of about 3:1 to 1:3. In yet other preferred embodiments, the ratio of crude oil to solubilizing agent is in the range of 5:1 to 1:1, about 4:1 to 1:1, or about 3:1 to 1:1. In general, and as shown by the examples provided herein, the amount of solubilizing agent that is required is believed to vary based on the type of crude oil that is being purified, and the composition of the solubilizing agent, for example with respect to the amount and composition of fatty acids in the solubilizing agent.

In certain embodiments, the oil mixture of crude oil and solubilizing agent can contain about 90% solubilizing agent (by volume or by weight). The oil mixture can also contain about 80%, about 70%, about 60%, about 50%, about 40%, about 30%, about 20%, about 10% and about 5% solubilizing agent.

After winterization, the purified oil, which is now a mixture of a purified fish oil from the source fish (e.g., mackerel, capelin, herring, or horse mackerel) and the solubilizing agent can be used as is for human consumption. It can also be desirable to remove the solubilizing agent after the winterization, so as to obtain a pure oil that only contains the source fish oil. Removal of the solubilizing agent can be done by methods known in the art. For example, the solubilizing agent can be removed by distillation, for example by distillation under vacuum or by air and/or steam stripping.

Preferably, the fish oil, after winterization is clear following a cold test. A cold test can be performed incubation at a low temperature for a prolonged period of time, such as at a temperature of −2 to +5° C. for 1 to 3 hours. Preferably, a cold test is performed by incubation for about 3 hours at, or around 0° C., for example by incubation in an ice bath. A fish oil that passes a cold test remains clear without any formation of stearin crystals at the end of the test.

The skilled person will appreciate that the winterization process described herein can be combined with other known methods for removing impurities from oil. Thus the oil can optionally undergo purification by other means, such as by acid/alkali treatment, neutralization, bleaching, deodorization and filtration, either before or following purification by the method described herein.

The invention further provides novel compositions. In one such aspect, the invention provides a composition that comprises an oil that is obtainable from fish, especially fatty fish, and a solubilizing agent that comprises an edible, fat-soluble organic compound or mixture of compounds, and that has a melting point that is lower than about 5° C. The oil can preferably be from a fatty fish, such as mackerel, horse mackerel, herring or capelin. Preferably, the oil is from a fatty fish selected from the group consisting of mackerel, horse mackerel, herring, sand eel, capelin and sparling. In some embodiments, the oil is from mackerel, horse mackerel, herring, sardine or capelin.

The solubilizing agent useful in the method and composition described herein ca preferably have a melting temperature that ranges from about −70° C. to about 5° C., such as −50° C. to about 5° C., such as about −40° C. to about 0° C., or about −30° C. to about −5° C. The upper limit of the range can be about 5° C., about 3° C., about 1° C., about 0° C., about −1° C., about −3°, about −5° C., about −7° C. or about −10° C. The lower limit of the range can be about −70° C., C, at −60° C., about −50° C., about −40° C., about −30° C., about −20° C., or about −10° C.

The solubilizing agent can also preferably comprise a fat-soluble organic compound or mixture of compounds that have melting temperature that ranges from about −50° C. to about 5° C., such as about −40° C. to about 0° C., or about −30° C. to about −5° C. The upper limit of the range can be about 5° C., about 3° C., about 1° C., about 0° C., about −1° C., about −3°, about −5° C., about −7° C. or about −10° C. The lower limit of the range can be about −70° C., about −60° C., about −50° C., about −40° C., about −30° C., about −20° C., or about −10° C.

The solubilizing agent can in general have the properties as described in the foregoing description of the solubilizing agent. It may be preferable that the solubilizing agent comprise at least one fatty acid provided as a free fatty acid, as a triglyceride or as an ethyl ester. The triglyceride and ethyl ester can in such embodiments either be simple or mixed. The fatty acid can also preferably comprise at least one omega-3 fatty acid, such as DPA, EPA and/or DHA. Further, the fatty acid can alternatively comprise at least one omega-6 fatty acid.

The ratio of the fish oil to solubilizing agent in the composition can be in the range of about 10:1 to 1:10 (volume:volume). For example, the ratio can be in the range of about 9:1 to 1:9, in the range of about 8:1 to 1:8, in the range of about 7:1 to 1:7, in the range of about 6:1 to 1:6, in the range of about 5:1 to 1:5, in the range of about 4:1 to 1:4, in the range of about 3:1 to 1:3, in the range of about 2:1 to 1:2, in the range of about 1.5:1 to 1:1.5, or in the range of about 1:1.

In certain embodiments, the composition comprises a mixture of the fish oil and a solubilizing agent that can contain about 90% solubilizing agent (by volume or mass). The oil mixture can also contain about 80%, about 70%, about 60%, about 50%, about 40%, about 30%, about 20%, about 10% and about 5% solubilizing agent.

The purified oils obtained by the winterization method disclosed herein can be useful in e.g. the food, feed and pharmaceutical industries. Fatty acids, in particular PUFAs, are known to exert effects on numerous biologically important pathways. For example, omega-3 fatty acids are believed to have potent antiinflammatory effects, they serve as precursors for potent anti-inflammatory lipids, resolvins and protectins, and they are known to regulate hepatic lipid metabolism via regulation of the expression of key enzymes involved in lipid synthesis and catabolism. Omega-6 fatty acids, on the other hand, have inflammatory, pyretic (fever), and pain promoting properties.

Thus, PUFAs, especially omega-3 PUFAs, have found great use as food additives or as food supplements. PUFAs are also used in pharmaceutical applications, such as in drugs for reducing risk of cardiovascular disease, and also in skin lotions.

Accordingly, the invention also provides purified fish oils, obtained by a winterization method as disclosed herein, for use as a food supplement, for use as a food additive, for use in pet food or in infant formulas, for use in a topical or skin lotion, and/or for use as a medicament, e.g. for the prevention of cardiovascular disease. Preferably, the purified oil is a fish oil from herring, horse mackerel, sand eel, mackerel and/or capelin. The purified fish oils can in some embodiments contain EPA and/or DHA in a total amount of 20% to 40% by weight or volume, such as about 20% to 35%, about 25% to 30%, about 25% or about 30%.

Exemplary embodiments of the invention include the following:

1. A method of purifying a fish oil by winterization, the method comprising steps of:

a) Mixing a non-winterized fish oil with a solubilizing agent to obtain an oil mixture;

b) Performing at least one successive step of incubating and filtering of the oil mixture at increasingly lower temperatures, collecting the filtrate after each filtering step for subsequent steps of incubation and filtering, wherein the temperature of the last filtering step is in a range from −10° C. to +5° C., and wherein the solubilizing agent is an edible, fat-soluble organic compound or mixture of compounds that has a melting point that is lower than the temperature of the last filtering step.

2. The method of clause 1, wherein incubation and filtering within each step is performed at the same temperature.

3. The method of clause 1 or clause 2, wherein the temperature difference between subsequent steps is in the range of 1° C. to 4° C.

4. The method of any one of the clauses 1 to 3, wherein the first step of incubating and filtering is performed at a temperature that is in the range of 8° C. to 12° C.

5. The method of clause 1, wherein the successive steps of incubating and filtering comprise:

c) Incubating the oil mixture at a first temperature that is in a range from +5° C. to +15° C.;

d) Filtering the mixture at a temperature that is equal to or lower than the first temperature to obtain a filtrate;

e) Incubating the filtrate obtained in step d) at a temperature that is lower than the temperature of steps c) and d);

f) Filtering the mixture from step e) at a temperature that is equal to or lower than the temperature in step e);

g) Optionally, performing additional incubation and filtering steps at increasingly lower temperatures, wherein each filtering step is performed at a temperature that is equal to or lower than the temperature of the previous incubation step;

wherein the temperature of the last filtering step is in a range from −10° C. to +5° C., and wherein the solubilizing agent is an edible, fat-soluble organic compound that has a melting point that is lower than the temperature of the last filtering step.

6. The method of any one of the previous clauses, wherein the temperature of the last filtering step is in the range of −5° C. to +2° C.

7. The method of an one of the previous clauses, wherein the temperature of the last filtering step is in the range of −3° C. to +1° C.

8. The method of any one of the previous clauses, further including a step of removing the solubilizing agent following the purifying of the oil mixture.

9. The method of clause 8, wherein the solubilizing agent is removed by distillation or by air stripping.

10. The method of any one of previous clauses, wherein the fish oil is selected from mackerel oil, horse mackerel oil, herring oil, sand eel oil, sparling oil and capelin oil.

11. The method of clause 10, wherein the fish oil is selected from mackerel oil, herring oil and capelin oil.

12. The method of any one of the preceding clauses, wherein the solubilizing agent comprises at least one fatty acid.

13. The method of clause 12, wherein the solubilizing agent comprises from 10 to 90% by weight of at least one fatty acid.

14. The method of clause 12 or clause 13, wherein the solubilizing agent comprises from 20 to 80% by weight of at least one fatty acid.

15. The method of clause 12 or clause 13, wherein the solubilizing agent comprises from 30 to 70% by weight of at least one fatty acid.

16. The method of any one of the clauses 12 to 15, wherein the solubilizing agent comprises at least one fatty acid selected from the group consisting of oleic acid, elaidic acid, linoleic acid, or stearic acid.

17. The method of any one of the clauses 12 to 16, wherein the fatty acid is provided as a triglyceride or an ethyl ester.

18. The method of clause 17, wherein the fatty acid is provided as a triglyceride.

19. The method of any one of clauses 13 to 18, wherein the solubilizing agent comprises at least one omega-3 fatty acid.

20. The method of clause 19, wherein the omega-3 fatty acid is EPA or DHA.

21. The method of clause 20, wherein the solubilizing agent comprises from 10% to 90% EPA and/or DHA.

22. The method of any one of the clause 12 to 21, wherein the solubilizing agent further comprises at least one omega-6 fatty acid.

23. The method of any one of the clauses 12 to 22, wherein the solubilizing agent further comprises squalene.

24. The method of any one of the preceding clauses, wherein the ratio of fish oil to solubilizing agent ranges from 10:1 to 1:1.

25. The method of clause 24, wherein the ratio of fish oil to solubilizing agent ranges from 5:1 to 1:5, from 4:1 to 1:4, from 3:1 to 1:3, or from 2:1 to 1:2.

26. The method of any one of the previous clauses, wherein the solubilizing agent has a melting point that is in the range from −70° C. to −10° C.

27. The method of clause 26, wherein the solubilizing agent has a melting point that is in the range from −60° C. to −10°, from −50° C. to −10° C., from −40° C. to −10° C., or from −30° C. to −10° C.

28. In a method of purifying a fish oil by sequential treatment steps of incubation and filtering at increasingly decreased temperature, the improvement that comprises a step of mixing a solubilizing agent with the fish oil prior to the treatment, wherein the solubilizing agent is an edible, fat-soluble organic compound that has a melting point that is lower than the temperature of the last filtering step, and wherein the ratio of fish oil to the solubilizing agent ranges from 10:1 to 1:1.

29. The improvement of clause 28, wherein the fish oil is selected from mackerel oil, horse mackerel oil, herring oil, sand eel oil, sparling oil or capelin oil.

30. The improvement of clause 29, wherein the fish oil is selected from mackerel oil, herring oil, horse mackerel oil, sparling oil or capelin oil.

31. The improvement of any of the clauses 28 to 30, wherein the solubilizing agent comprises from 10 to 90% by weight of at least one fatty acid.

32. The improvement of any of the clauses 28 to 31, wherein the solubilizing agent comprises from 20 to 80% by weight of at least one fatty acid.

33. The improvement of any of the clauses 28 to 32, wherein the solubilizing agent comprises from 30 to 70% by weight of at least one fatty acid.

34. The improvement of any one of the clauses 31 to 33, wherein the fatty acid is provided as a triglyceride or an ethyl ester.

35. The improvement of clause 34, wherein the fatty acid is provided as a triglyceride.

36. The improvement of any one of clauses 33 to 35, wherein the fatty acid is an omega-3 fatty acid.

37. The improvement of clause 36, wherein the omega-3 fatty acid is EPA or DHA.

38. The improvement of clause 37, wherein the solubilizing agent comprises from 10 to 90% EPA and/or DHA.

39. A purified fish oil, obtained by a winterization method according to any one of clauses 1 to 27.

40. A composition comprising
 a. A fish oil obtainable from a fish species selected from mackerel, herring and capelin
 b. A solubilizing agent that is an edible, fat-soluble organic compound or mixture of compounds and that has a melting point between −60° C. and −10° C.

41. The composition of clause 40, wherein the solubilizing agent comprises at least one fatty acid.

42. The composition of clause 41, wherein the solubilizing agent comprises from 10 to 90% by weight and/or volume of at least one fatty acid.

43. The composition of clause 41, wherein the solubilizing agent comprises from 20 to 80% by weight and/or volume of at least one fatty acid.

44. The composition of clause 41, wherein the solubilizing agent comprises from 30 to 70% by weight and/or volume of at least one fatty acid.

45. The composition of any one of clauses 42 to 44, wherein the fatty acid is selected from the group consisting of oleic acid, elaidic acid, linoleic acid, and stearic acid.

46. The composition of any one of clauses 41 to 45, wherein the fatty acid is provided as a triglyceride or an ethyl ester.

47. The composition of clause 46, wherein the fatty acid is provided as a triglyceride.

48. The composition of any one of clauses 41 to 47, wherein wherein the solubilizing agent comprises at least one omega-3 fatty acid.

49. The composition of clause 48, wherein the at least one omega-3 fatty acid is selected from e.g. EPA, DPA and DHA.

50. The composition of 49, wherein the solubilizing agent comprises from 10 to 90% by weight or volume of EPA and/or DHA.
51. The composition of 50, wherein the solubilizing agent comprises from 30 to 80% by weight or volume EPA and/or DHA.
52. The composition of any one of the clauses 40 to 48, wherein the solubilizing agent further comprises squalene.

It is to be understood that the invention is not intended to be limited to the particular embodiments that are described in the foregoing. It is also to be understood that the terminology used herein is for the purpose of describing particular embodiments, and is not intended to be limiting in any way.

It should be noted that as used herein, the singular forms "a," "an," and "the" include plural references unless the context clearly dictates otherwise. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also contemplated, subject to any specifically excluded limit in the stated range. Where the stated range includes one or both of the limits, ranges excluding either or both of those included limits are also contemplated.

It should be understood that the particular embodiments, methodology, materials, and substances, etc., described herein can vary. Thus, variations that are within the skills of the ordinary practitioner are also contemplated. The terminology used herein is for the purpose of describing particular embodiments only, and is not intended to limit the scope of the present invention.

The invention will now be exemplified by the following non-limiting examples.

EXAMPLE 1. SOLUBILIZING AGENT

A solubilizing agent for stabilizing fish oil during winterization comprises ethyl esters of fatty acids, with 2.0-3.0 mg/g of mixed tocopherols added. The tocopherols are of non-GMO variety. The solubilizing agent was found to have the following composition:

| Parameter | Unit | Value |
|---|---|---|
| C20:5n3 (EPA) | mg/g as EE | 360 |
| C20:5n3 (EPA) | mg/g as FFA | 330 |
| C22:6n3 (DHA) | mg/g as EE | 240 |
| C22:6n3 (DHA) | mg/g as FFA | 220 |
| Total omega-3 | mg/g as EE | 630 |
| Total omega-3 | mg/g as FFA | 580 |
| Acid value | mg KOH/g | 1.0 |
| Peroxide value (PV) | mEq/kg | 2.0 |
| Anisidine value (AV) | Units | 10 |
| Totox (2 × PV × AV) | Units | 12 |
| Colour | Gardner | 5 |
| Cold test | Hours/0° C. | 3 |
| Specific gravity | Range | 0.84-0.91 |
| Absorbance at 233 nm | Units | 0.6 |
| Oligomers + parital glycerides | % | 7.0 |

EXAMPLE 2. WINTERIZATION OF CRUDE FISH OIL FROM HERRING, MACKEREL AND CAPELIN

1. Objectives

This experiment is performed to investigate how well conventional crude fish oils originated from mackerel, herring and capelin is suited for winterization. A part of the mackerel, herring and respective capelin oil refining process is winterization. If effective winterization is not possible for these fish oils then they are not well suitable or economically feasible for human consumption or as source of raw material for production of food grade fish oils and omega-3 fatty acids.

2. Winterization of Herring, Capelin and Mackerel Crude Fish Oils 2.1. Crude Herring Oil Three samples of herring oil and herring oil mixed with a solubilizing agent were inspected for winterization. Firstly they were put into adjustable refrigerator set at 10° C. and left until equilibrium temperature was reached.

| ID no. | Sample no. | Description |
|---|---|---|
| 1409HBG001 | 1 | Crude herring oil |
| 1410HBG002 | 2 | Crude herring oil mixed with 50% of solubilizing agent |
| 1410HBG003 | 3 | Crude herring oil mixed with 35% of solubilizing agent |

After storage for two hours the samples were as shown in FIG. 1. Sample nr. 1 was solidified and not suitable for filtration, sample 2 could be filtered and sample 3 was clear.

2.2. Capelin and Mackerel Crude Fish Oils

Similar studies were carried out for capelin and mackerel crude fish oils by placing one sample of crude fish oil for each fish species in a cooler. The mackerel fish oil sample has sample no. 1410HBG005 and the capelin fish oil sample no. 1409SVN001.

For the first round the cooler was set to 13° C. and the samples were kept overnight, after which the samples were inspected for suitability of filtration. The capelin oil sample was totally solidified while the mackerel oil was slightly liquid but not suitable for filtration. After incubation for another night in the cooler at 14° C. the capelin oil was still solidified but the mackerel oil was sufficiently liquefied for filtration. The capelin oil wasn't liquefied enough for filtration at 15° C., but at 16° C. the capelin oil was adequately liquid for filtration.

3. Conclusion

As demonstrated above, crude herring, mackerel- and capelin oil cannot be effectively winterized unless above 10° C. Addition of solubilizing agent markedly improves solubility of the crude oil.

EXAMPLE 3. WINTERIZATION OF HERRING OIL

Objectives

Refine herring oil mixed with solubilizing agent to a final concentration of 33% and processed on increased scale. This experiment is preparation for scale up for pilot production (refining) of herring oil resulting in herring oil suitable as food supplement for human consumption (food grade). Part of the herring oil refining process is winterization which is the main objective in this experiment.

1. Winterization. The winterization is carried out in two main steps (precooling/incubation and filtration), to avoid that the oil fully solidifies. Mainly saturated and long monounsaturated fatty acids and inevitably will solidify, but other fatty acids will unavoidably also be lost through the separation of the stearin.

a. Precooling. Cool the fish oil until suitable amount of the oil is solidified (crystallized) for filtration. For example 10-11° C., according to previous experiments.

b. Filtration. Important is to filter the oil at the same temperature as the precooling, filtrate through filter paper in Buchner funnel with vacuum.

c. Processing steps A and B should be repeated with lower temperatures until 0° C. is reached.

d. Non-destearinated test (cold-test) should be carried out afterwards according to standards. After 3 hour storage in 0° C. the fish oil must be clear without any stearin (crystallized fatty acids) formation.

Winterization Process

Figure 2:
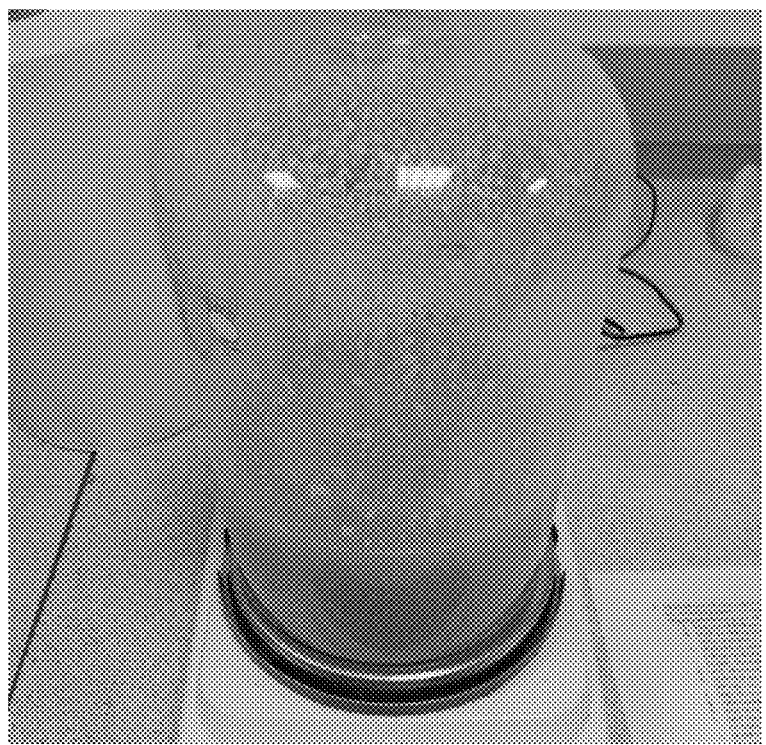
FIG. 2 shows herring oil after mixing with solubilizing agent (33% final concentration).

Crude fish oil from Icelandic herring which was mixed with solubilizing agent as described under Example 1 to a 33% concentration. The mixture was stirred and stored in a refrigerator along with the filtering equipment. As can be seen in FIG. 2 a bit of stearin was left on the walls of the mixing flask.

Filtration at 10-11° C.

Figure 3:
FIG. 3 shows herring oil after winterization at 10-11° C. with 33% solubilizing agent.

After precooling in refrigerator set at 11° C., the initial temperature of the oil was just above 11° C. when the filtration started. First the solution was filtered through single 30 μm filter paper. In the second round a filtration through double 11 μm filter paper at 10-10.5° C. was performed. After filtration at 10-11° C. about 88% of initial weight was winterized herring oil (FIG. 3).

Filtration at 6-7° C.

Figure 4:
FIG. 4 shows herring oil after filtration at 6-7° C.

After the first filtration, the refrigerator was set to 5° C. and the oil and the filtering equipment left over night. The oil was at 4.6° C. the morning after and solidified, but was taken out from the refrigerator and was liquefied enough at 6.5° C. to be ready for filtration. The refrigerator was set to 7° C. which in reality turned out to be about 6-6.5° C. at the bottom. First the oil was filtered through double 20 μm filter paper and the initial temperature of the oil was 6.5° C. The filtration went well in the beginning but slowed down in the course of filtration. The oil was then filtered through a new filter paper. The temperature lowered a bit between rounds so the temperature of the oil in the end was between 4 and 5° C. About 92% of the oil came through the filter. FIG. 4 shows the oil after this step.

Filtration at 2° C.

Figure 5:
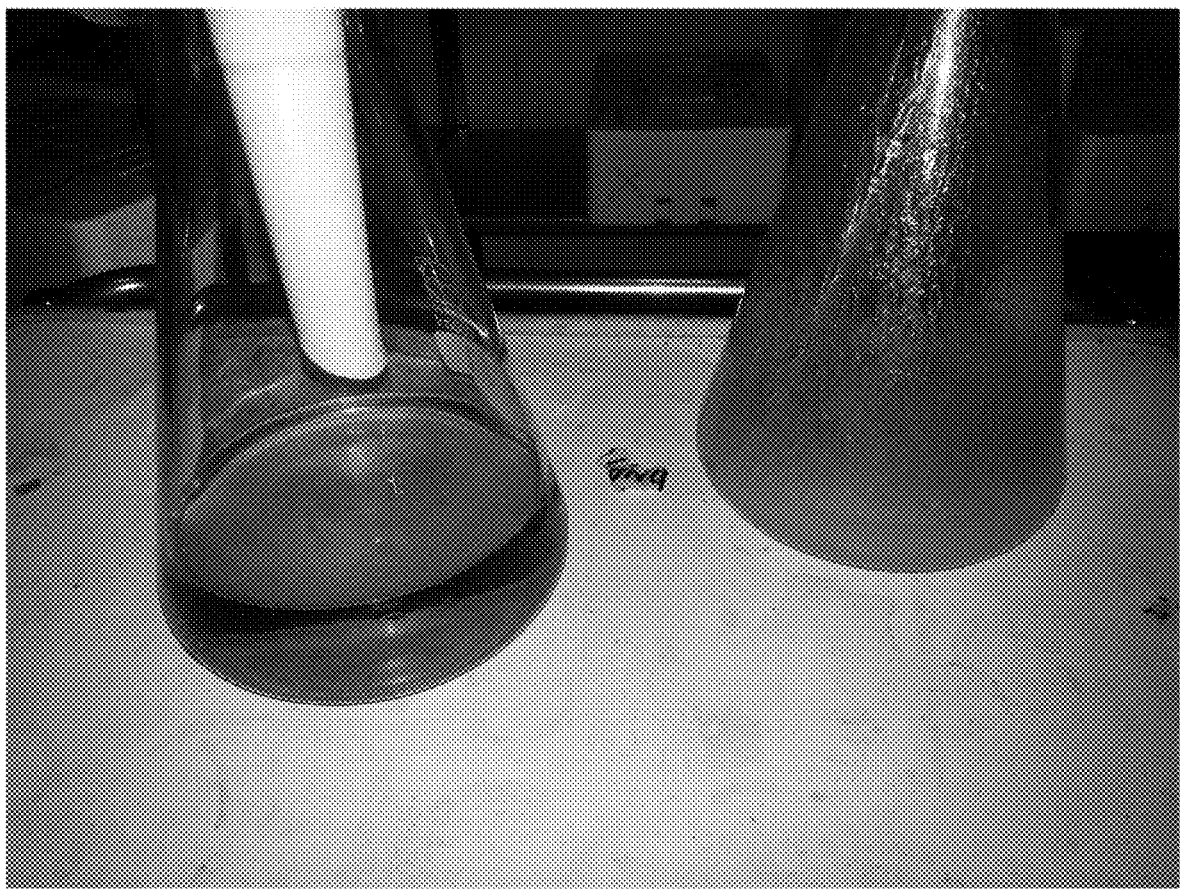
FIG. 5 shows herring oil before (on the right) and after (on the left) filtration at 2° C.

The refrigerator was set to 1° C. and the oil and the filtering equipment left over night. The temperature of the oil before filtration was 1.8-2.0° C. Filtration was performed through double 20 μm filter paper. The oil flask was subsequently cooled further in a slurry ice down to 0.5° C., and filtered through double 11 μm filter paper for an overall oil yield of 91%. FIG. 5 shows the oil before and after this filtration step.

Filtration at 0° C.

The oil was placed in a big cooler set at −1° C. and stored overnight, the initial temperature of the oil was −0.3° C. The oil was filtered through double 20 μm filter paper and the yield was 97%.

Cold-Test (Non-Destearinated)

Figure 6:
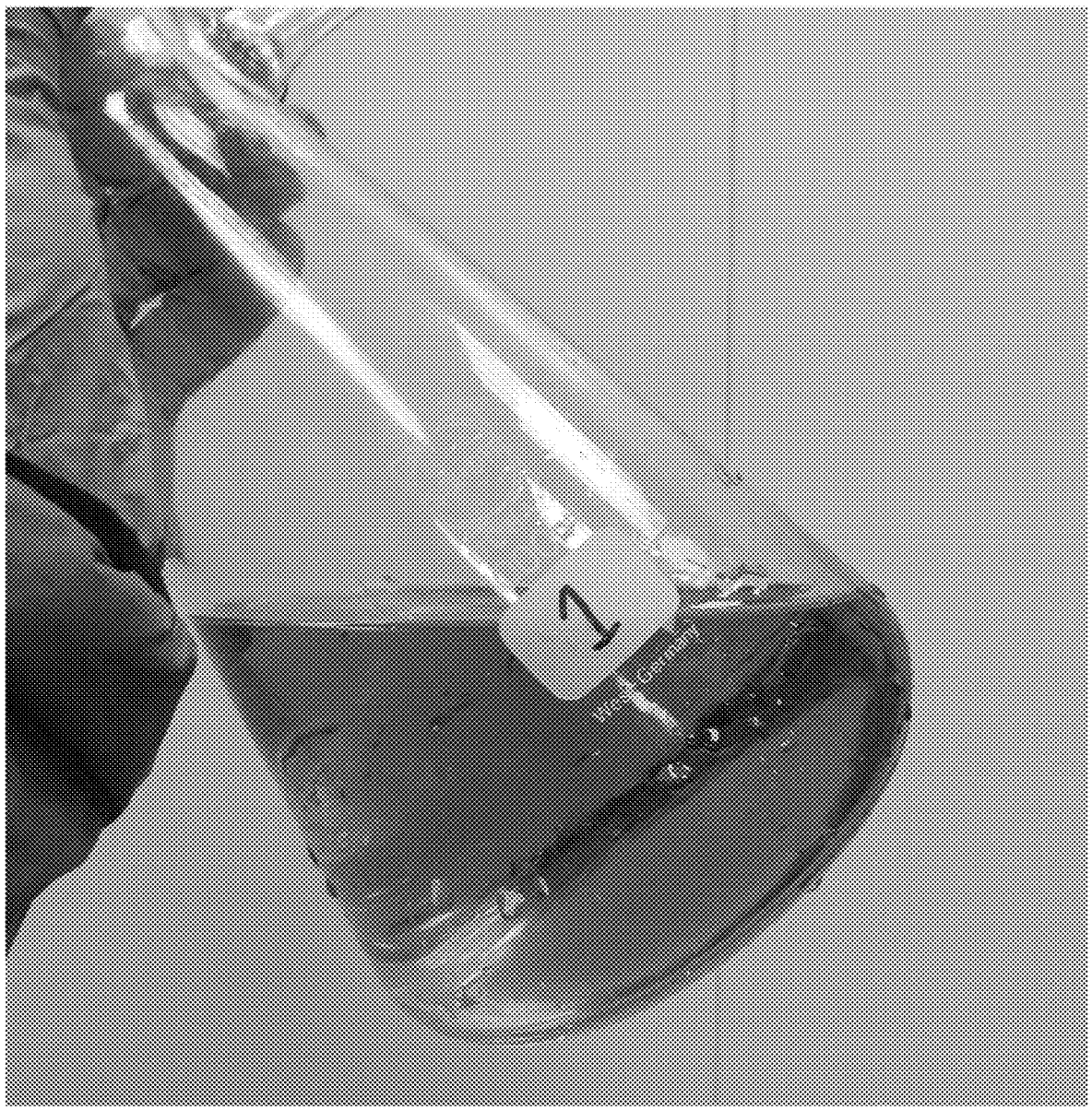
FIG. 6 shows the final winterized herring oil, after a cold test at 0° C. for 3 hours.

The final winterized herring oil was tested for clarity by a cold-test, in which the oil was incubated on ice for 3 hours. As can be seen in FIG. 6, the fish oil is clear after storage in ice slurry for 3 hours.

Conclusions

As demonstrated above a mixture of herring oil and 33% of solubilizing agent can be winterized for a clear oil at 0° C. The total yield of the winterization is 71% of fish oil (see Table 1), the other 29% is mainly saturated and long monounsaturated fatty acids but inevitably other fatty acids will also be lost in the filtration process.

TABLE 1

Weight of the oil after filtration.

|  | Weight (g) | Yield |
| --- | --- | --- |
| Initial weight of fish oil (M) | 935.90 |  |
| Loss of fish oil | 82.10 |  |
| Amount of fish oil filtered | 853.80 |  |
| After 1. Filtration at 11° C. 30 μm | 836.10 | 89.3% |
| After 2. Filtration at 10° C. 11 μm | 813.06 | 97.9% |
| After 3. Filtration at 6-7° C. 20 μm | 738.19 | 91.8% |
| After 4. Filtration at 6° C. 20 μm | 730.01 | 99.7% |
| After 5. Filtration at 2° C. 20 μm | 653.34 | 91.3% |
| After 6. Filtration at 1° C. 20 μm | 633.15 | 99.4% |
| After 7. Filtration at 0° C. 20 μm | 604.07 | 97.3% |
| Final weight | 604.07 | 70.8% |

EXAMPLE 4. WINTERIZATION OF MACKEREL AND CAPELIN OIL

Objectives

Refine mackerel and capelin oil mixed with 33% of solubilize agent and processed on large lab-scale of ca. 1 kg. This experiment is preparation for scale up for pilot production (refining) of mackerel and capelin oil resulting in oil suitable as food supplement for human consumption (food grade). Part of the refining process is winterization which is the main objective in this experiment.

2. Winterization. The winterization is carried out in two main steps (incubation and filtering), to avoid that the oil fully solidifies. Although mainly saturated and long monounsaturated fatty acids are separated by crystallization to form a stearin precipitate, other fatty acid will inevitably also be lost in the separation/crystallization of the stearin.

a. The solubilizing agent used was a 60% Ethyl ester fish oil, see typical contents in Example 1.

b. Precooling. Cool the fish oil until suitable amount of the oil is solidified (crystallized) for filtration. For example 10-11° C., according to previous experiments.

c. Filtration. It is important to filter the oil at the same temperature as the precooling, filtrate through filter paper in Buchner funnel with vacuum.

d. Processing steps B and C should be repeated with lower temperatures until 0° C. is reached.

e. Non-destearinated test (cold-test) should be carried out afterwards according to standards. After 3 hour storage in 0° C. the fish oil must be clear without any stearin (crystallized fatty acids).

Method

Raw fish oil from mackerel and capelin was mixed with 33% of solubilizing agent, the mixture was stirred and stored in a refrigerator.

TABLE 2

Overview of the amount of fish oil and solubilizing agent to be winterized.

|  | Weight (g) | Solubilizing agent (g) | Total |
|---|---|---|---|
| Mackerel oil | 445.92 | 219.65 | 665.57 |
| Capelin oil | 468.89 | 230.94 | 699.83 |

One sample of each species was placed in a cooler. For the first round the cooler was set to 13° C. and the samples were kept overnight, afterwards the samples were inspected for availability of filtration. The capelin sample was totally solidified while the mackerel oil was slightly liquid but not suitable for filtration. After another night in the cooler at 14° C. the capelin oil was still solidified but the mackerel oil was sufficiently liquid for filtration. The capelin oil wasn't liquefied enough for filtration at 15° C., but at 16° C. the capelin oil was adequately liquid for filtration.

Capelin Oil Filtration at 9.5-10.5° C.

Figure 7:
FIG. 7 shows capelin oil after incubation and filtering at 9.5-10.5° C.

After storage in a refrigerator at 11° C. the initial temperature was 9.5-10° C. when filtration started. First filtration was performed through a double 20 μm filter paper, and did the filtration go well. In the second round filtration was done through double 20 μm filter paper with initial temperature of the oil at 9.3-9.5° C. After filtration the oil yield was 96% of the initial weight. FIG. 7 shows the capelin oil after this filtration step.

Filtration of Mackerel Oil at 9° C.

After incubation, the mackerel oil was filtered at 9° C., the fish oil was viscous and it was difficult to pour. The filtration took more than an hour, but with 97% yield. It might have been possible to start the filtration at 8° C., due to high yield in the first round.

Filtration of Capelin Oil at 6° C.

After the first filtration, the refrigerator was set to 5° C. and the oil and the filtering equipment left overnight. The sample was too crystallized for filtration after the overnight incubation, and it was therefore stored for a short time at warmer conditions, and filtration was started when the sample reached 6° C. After filtration at 6° C. the oil yield was 96.5%.

Filtration of Mackerel Oil at 5° C.

Figure 8:
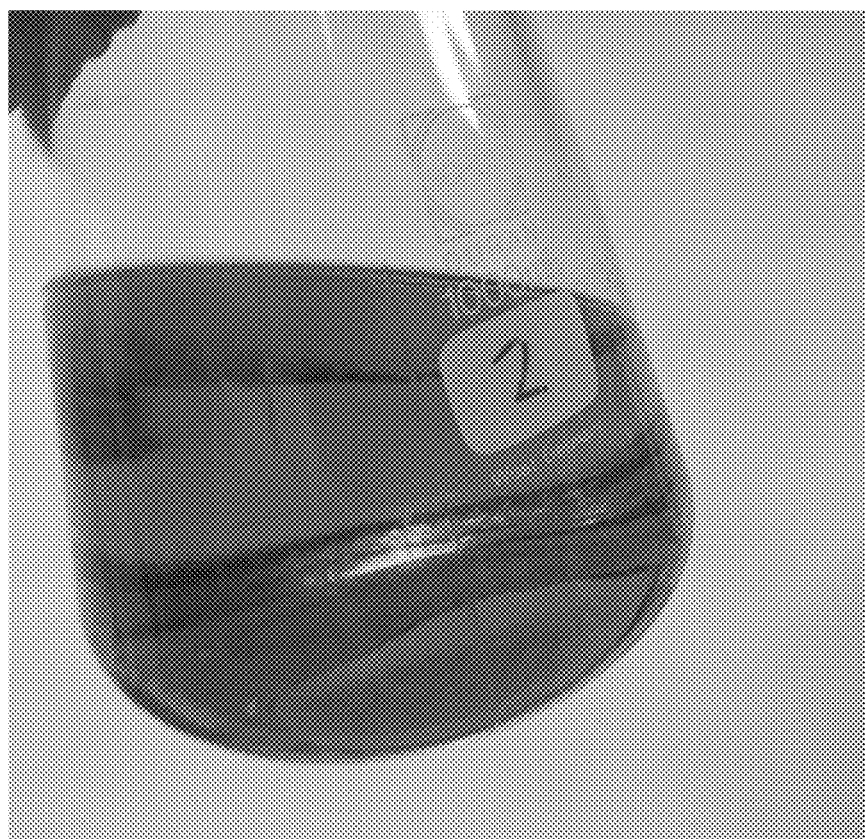
FIG. 8 shows mackerel oil after incubation and filtering at 5° C.

The initial temperature of the fish oil before filtration was 4.8-5.0° C. and did the filtration go well and took 50 min. The oil yield was 91.9% in this step, which is 88% of the initial weight. In FIG. 8 is shown the mackerel oil after this step.

Filtration of Capelin Oil at 1° C.

The initial temperature of the fish oil before filtration was 0.7° C., while the refrigerator was set to 2° C., the fish oil was viscous at 0.7° C. The filtration went off well but ended after one and a half hour. 87% of the oil went through the filter therefore the total yield is 83%.

Filtration of Mackerel Oil at 0° C.

The initial temperature of the mackerel oil before filtration was −1.5° C. and the oil was rather viscous, but the ambient temperature was 2° C. and the filtration started, which took about an hour. The temperature of the oil after filtration was 0.7° C. The oil yield was 91% for this step, and 83.2% of the initial weight of raw oil.

Additional Filtration of Capelin Oil at −1° C.

The capelin oil and filtering equipment was placed inside a big cooler set at −1° C. and stored overnight. The initial temperature of the fish oil before filtration was −1.5° C., it was filtered through double 20 μm filter paper. The oil yield was 91.9%, or 76.5% of initial raw oil weight.

Cold Test

Figure 9:
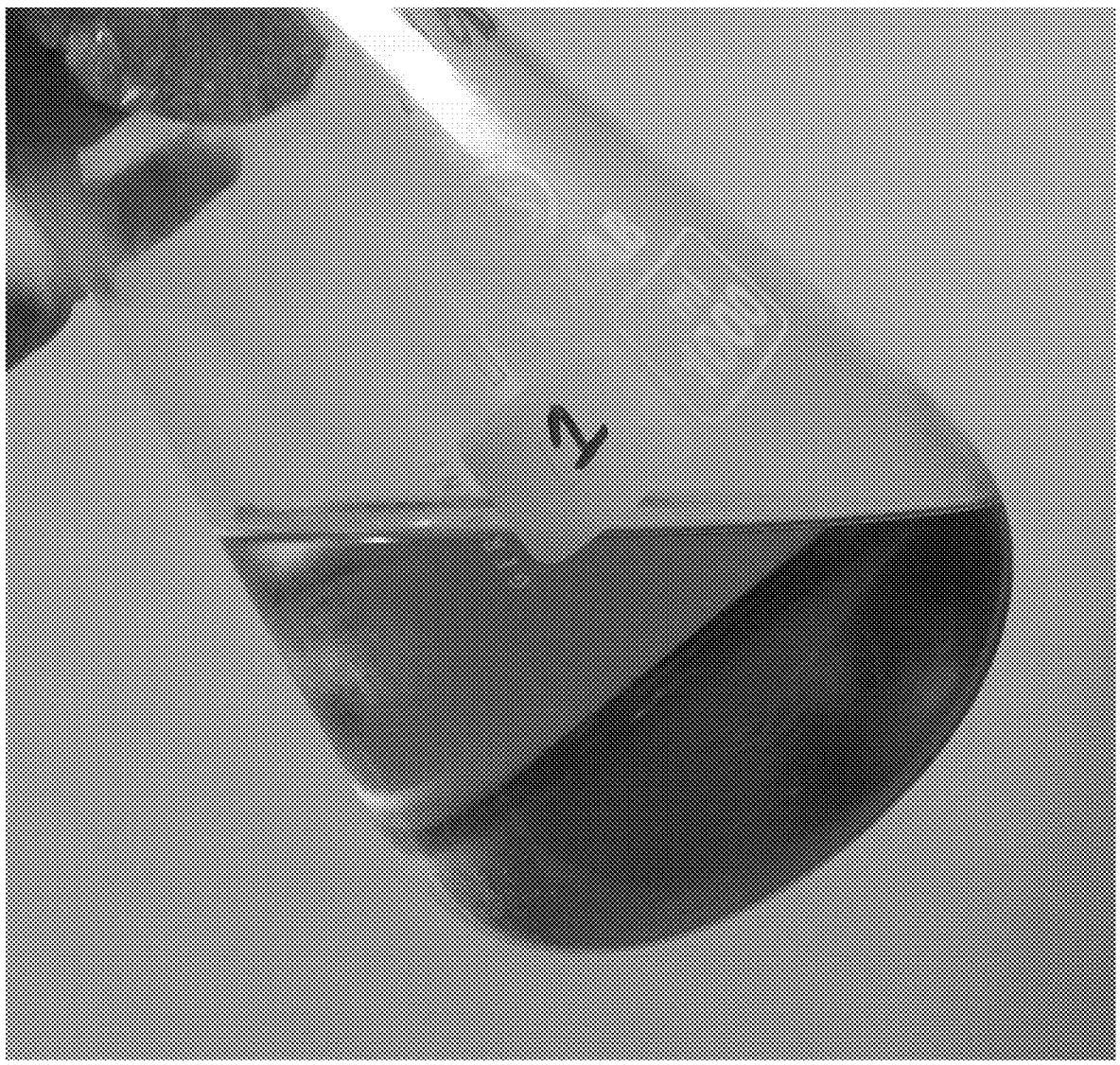
FIG. 9 shows mackerel oil after winterization and overnight refrigeration.
Figure 10:
FIG. 10 shows capelin oil after winterization and overnight refrigeration.

Samples of the final winterized capelin and mackerel oil were stored on the bottom in a refrigerator overnight. As shown in FIG. 9 and FIG. 10, the oils were clear of stearin after storage in a cooler at 0-4° C.

Conclusion

As demonstrated above both mackerel and capelin oil mixed with 33% of solubilizing agent can be winterized in 3 to 4 steps. Winterization of mackerel was easier than capelin, which suggests that the ratio of solubilizing agent could be lowered, or the number of steps in the winterization process could be reduced. The total yield for the mackerel oil was 83%, compared to 76% for the capelin oil, see Tables 3 and 4.

TABLE 3

Weight of the capelin oil after filtration.

| Capelin | Weight (g) | Yield |
|---|---|---|
| Initial weight of fish oil | 692.06 | |
| Loss of fish oil | 97.00 | |
| Amount of fish oil filtered | 595.06 | |
| After 1. Filtration at 10° C. 20 μm | 658.64 | 97.6% |
| After 2. Filtration at 6° C. 20 μm | 609.46 | 96.5% |
| After 3. Filtration at 1° C. 20 μm | 513.02 | 87.2% |
| After 4. Filtration at −1° C. 20 μm | 455.11 | 91.9% |
| Final weight | 455.11 | 76.5% |

TABLE 4

Weight of mackerel the oil after filtration.

| Mackerel | Weight (g) | Yield |
|---|---|---|
| Initial weight of fish oil | 663.92 | |
| Loss of fish oil | 48.94 | |
| Amount of fish oil filtered | 614.98 | |
| After 1. Filtration at 9° C. 20 μm | 625.83 | 96.7% |
| After 2. Filtration at 5° C. 20 μm | 568.91 | 92.3% |
| After 3. Filtration at 0° C. 20 μm | 511.74 | 93.2% |
| Final weight | 511.74 | 83.2% |

TABLE 5

Typical fatty acid profile of crude mackerel oil.

| Fatty acid | Percentage % |
|---|---|
| C14:0 | 6.8 |
| C16:0 | 12.2 |
| C16:1 n-7 | 4.7 |
| C16:2 n-4 | 0.4 |
| C16:3 n-3 | 0.2 |
| C16:4 | 0.6 |
| C17:0 | 0.2 |
| C18:0 | 1.7 |
| C18:1 n-9 | 8.8 |
| C18:1 n-7 | 1.8 |
| C18:2 n-6 | 1.5 |
| C18:3 n-3 (ALA) | 1.3 |
| C18:3 n-6 | 0.1 |
| C18:4 n-3 | 4.1 |
| C20:0 | 0.2 |
| C20:1 n-7 | 0.2 |
| C20:1 n-9 | 9.3 |

TABLE 5-continued

Typical fatty acid profile of crude mackerel oil.

| Fatty acid | Percentage % |
|---|---|
| C20:1 n-11 | 0.8 |
| C20:2 n-6 | 0.2 |
| C20:3 n-3 | 0.1 |
| C20:3 n-6 | 0.0 |
| C20:4 n-3 | 0.8 |
| C20:4 n-6 (AA) | 0.5 |
| C20:5 n-3 (EPA) | 8.1 |
| C21:5 n-3 | 0.4 |
| C22:0 | 0.0 |
| C22:1 n-9 | 0.9 |
| C22:1 n-11 | 15.9 |
| C22:5 n-3 | 1.3 |
| C22:5 n-6 | 0.2 |
| C22:6 n-3 (DHA) | 11.3 |
| C24:1 n-9 | 0.8 |
| SFA | 21.1 |
| MUFA | 43.3 |
| PUFA | 31.1 |
| Unknown: | 4.4 |
| Omega-3 | 27.3 |
| Omega-6 | 2.6 |
| Omega-9 | 19.9 |

TABLE 6

Typical fatty acid profile of crude capelin oil.

| Fatty acid | Percentage % |
|---|---|
| C14:0 | 6.6 |
| C16:0 | 9.6 |
| C16:1 n-7 | 7.8 |
| C16:2 n-4 | 0.3 |
| C16:3 n-3 | 0.2 |
| C16:4 | 0.4 |
| C17:0 | 0.0 |
| C18:0 | 1.0 |
| C18:1 n-9 | 11.2 |
| C18:1 n-7 | 2.9 |
| C18:2 n-6 | 1.2 |
| C18:3 n-3 (ALA) | 0.4 |
| C18:3 n-6 | 0.0 |
| C18:4 n-3 | 1.7 |
| C20:0 | 0.0 |
| C20:1 n-7 | 1.1 |
| C20:1 n-9 | 18.8 |
| C20:1 n-11 | 0.0 |
| C20:2 n-6 | 0.2 |
| C20:3 n-3 | 0.0 |
| C20:3 n-6 | 0.0 |
| C20:4 n-3 | 0.3 |
| C20:4 n-6 (AA) | 0.1 |
| C20:5 n-3 (EPA) | 4.8 |
| C21:5 n-3 | 0.1 |
| C22:0 | 0.0 |
| C22:1 n-9 | 2.9 |
| C22:1 n-11 | 21.3 |
| C22:5 n-3 | 0.4 |
| C22:5 n-6 | 0.0 |
| C22:6 n-3 (DHA) | 2.4 |
| C24:1 n-9 | 0.7 |
| SFA | 17.2 |
| MUFA | 66.8 |
| PUFA | 12.5 |
| Unknown: | 3.6 |
| Omega-3 | 10.0 |
| Omega-6 | 1.5 |
| Omega-9 | 33.6 |

EXAMPLE 5. WINTERIZATION OF HERRING OIL WITH ETHYL OLEATE

Objectives

Refine herring oil mixed with 30% of the solubilizing agent ethyl oleate. This experiment is intended to prove the concept that it is possible to winterize herring oil more efficiently with ethyl oleate than without. This experiment is also preparation for scale up for pilot production (refining) of herring oil resulting in herring oil suitable as food supplement for human consumption (food grade). Part of the herring oil refining process is winterization which is the main objective in this experiment.

1. Winterization. The winterization is carried out in two main steps to avoid that the oil fully solidifies. Mainly saturated and long monounsaturated fatty acids (which form stearin wax) precipitate out, but inevitably other fatty acids will also be removed with the separation of the stearin.

a. Precooling. Cool the fish oil until suitable amount of the oil is solidified (crystallized) for filtration. For example 5-6° C., according to previous experiments.

b. Filtration. Important is to filter the oil at the same temperature as the precooling, filtrate through filter paper in Buchner funnel with vacuum.

c. Processing steps a and b should be repeated with lower temperatures until 0° C. or lower is reached.

d. Non-destearinated test (cold-test) should be carried out afterwards according to standards. After 3 hour storage in 0° C. the fish oil must be clear without any stearin (crystallized fatty acids).

Winterization

Crude herring oil from three different fishmeal factories in Iceland, H B Grandi, Ísfélag Vestmannaeyja and Sildarvinnslan, was mixed with 30% (mass) of solubilizing agent ethyl oleate, which was a 98% mixture of homogenous fatty acid esters from Acros organics (Thermo Fisher Science). The mixture was stirred and stored in a refrigerator along with the filtering equipment. The winterization mixture included 490 g herring oil and 208 g ethyl oleate.

Filtration Steps

The sample was placed in a cooler. For the first round the cooler was set to 6.0° C. and the sample were kept overnight, afterwards the sample were inspected for availability of filtration.

The sample was thick at 5.5° C., but it was put through filtration with double 11 μm filter paper, and the filtration was slow and took 90 minutes.

A second filtration step was performed at 2° C.

Figure 11:
FIG. 11 shows herring oil after winterization using ethyl oleate as solubilizing agent at 2° C.

The yield after two steps of filtration was 499.4 g of clear fish oil, see FIG. 11, for a yield of 75.7%.

Cold Test

A 3 hour ice bath cold test was performed on the final distillate and was successfully passed without any formation of stearin crystals.

Conclusion

This experiment shows that herring oil, mixed with 30% of ethyl oleate, can be winterized with high yield in 2-3 steps.

EXAMPLE 6. WINTERIZATION OF HERRING OIL ON INDUSTRIAL SCALE

Summary

Two different refining trials for crude herring oil were performed in an industrial scale fish oil refinery. All refining processes including the winterization process were performed by and according to proposed standard procedures proposed by the experienced professionals working in the fish oil refinery.

The main objective of this trial was to confirm whether it is possible to winterize Herring fish oil on industrial scale by application of a special winterization process developed by Margildi. During winterization the main objective is to separate so-called stearin from the crude oil. Two fractions are created during the winterization process, olein and stearin. Winterization of fish oil is successful when the olein fraction withstands so-called 3 hour cold test at 0° C.

The refining processes performed consisted of:
Winterization
Bleaching
Deodorization The main equipment applied in the trials consisted of following (see further pictures below):
Crystallization tank total volume 6000 L and related Filtration press for winterization
Bleaching tank and bleaching filter unit
Deodorization reactor unit Raw material for the trials consisted of crude Herring fish oil from fish meal factories and crude cod liver oil (CLO) from fish oil factory.

First Winterization Trial.

The winterization was performed with crude Herring oil out of 4 pcs. 1000 L Intermediate Bulk Container (IBC) lot nr. 150039, and 1 pcs. IBC from lot 140623 for a total volume of approximately 5000 L all mixed in the crystallization tank.

After cooling in the crystallization tank for several hours the oil was filtered by pumping it in several batches (few hundred liters at a time) through the Filtration press. It turned out to be impossible to filter all the oil in the crystallization tank as the filtration press became clogged after a few filtering lots and the filtration process was stopped and the rest of the crude oil was kept in the crystallization tank for next batch.

Figure 12:
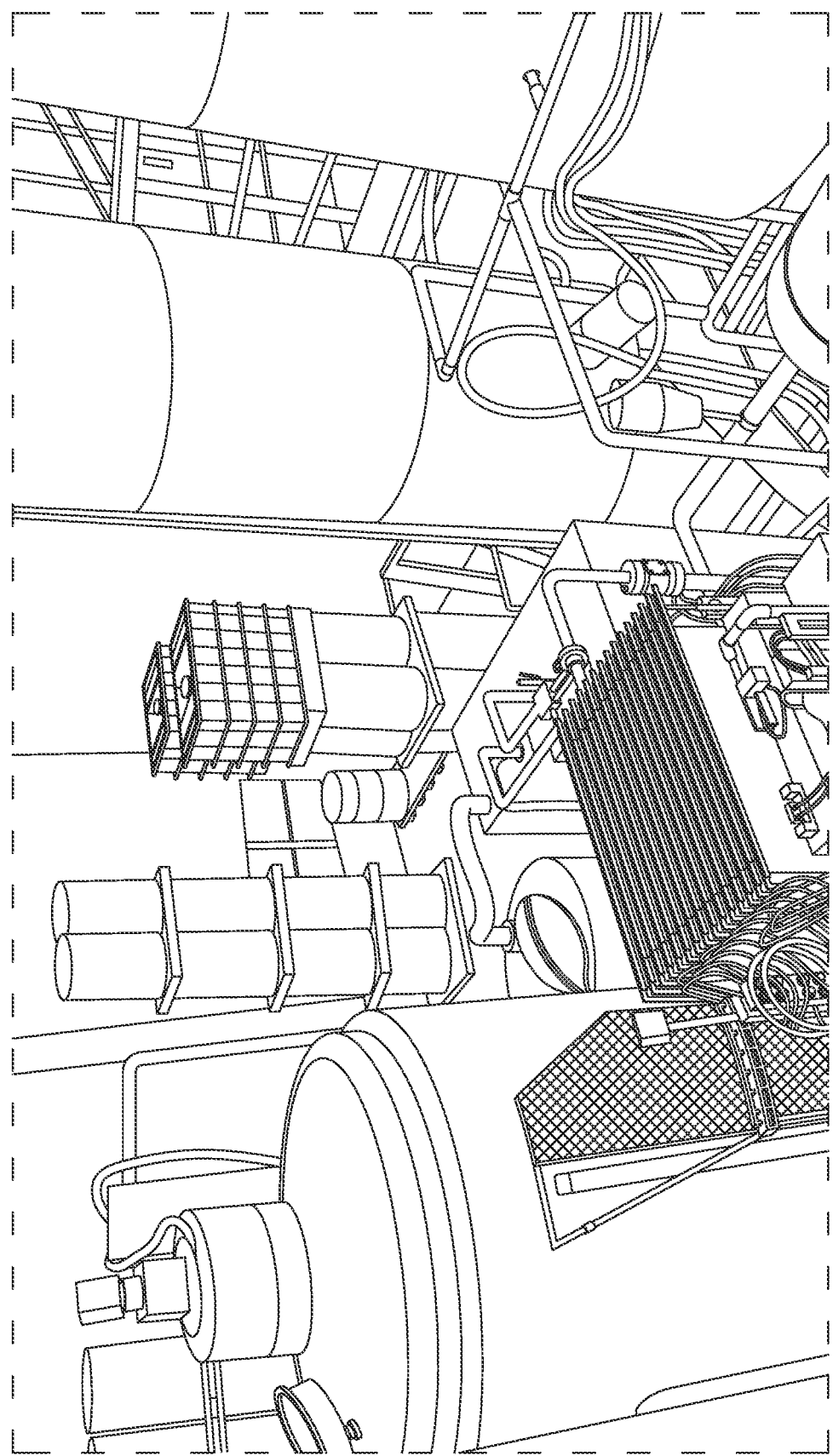
FIG. 12 shows a crystallization tank (left) and filtration press (right).

Now some 500 L of crude Herring oil from lot 140623 were added to the existing remaining crude Herring oil in the crystallization tank (FIG. 12) to increase the volume of crude oil being winterized total volume of approximately 5400 L. Then the crude oil was crystallized and filtered according to standard procedures few hundred liters at a time pumped through the Filter press. The Filter press always got clogged after a few batches of crystallized crude oil had been pumped through the Filter press. Therefore the winterization process (filtration) was stopped after a while without successful winterization of all the crystallized crude oil.

The above was repeated two times more for third and fourth winterization without success. For the fifth and last trial some 1500 L from crude Herring oil from lot 140623 were added to the crystallization tank. The crude oil was partly winterized out of the earlier winterization lots described here earlier.

Figure 13:
FIG. 13 shows picture of fish oil that did not withstand 3 hour cold test and became solidified (frozen).

After five batches of crystallization and filtration with huge losses of stearin, the winterized oil (olein fraction) did still not withstand a 3 hour cold test which means that it became fixed matter (frozen) see FIG. 13. The trial was stopped with the conclusion that a normal crude oil from herring can't be winterized neither technically nor economically with current winterization processes.

Second Winterization Trial.

For the second trial winterization was performed with crude Herring oil (HO) (lot 1603SVH-01-04) and crude Cod liver oil (CLO) triglycerides (lot 1603HTC-01-03). For the first batch the crude oil was mixed 3 pcs. IBC of each crude oil for a total of ca. 5400 L, then the mixture was crystallized and filtered as according to standard winterization process of crude oil. The first batch was stopped after a while due to clogging in the Filter press and the batch process was halted. The main reason to stop filtering was that the filter cloth of the Filter press was completely clogged and impossible to perform this part of the trial. The filtration cloths in the Filter press were renewed (exchanged for clean cloth) before starting up another winterization batch.

Ca. 1000 L of crude Herring oil from the first winterization trial was added to the total quantity of non-winterized oil in the crystallization tank and then the total mixture was bleached.

This mixture was then successfully winterized after two rounds of crystallization and filtration.

Objectives

To firstly, winterize sole crude Herring oil.

Secondly, to winterize Herring oil mixed with Cod liver oil (CLO) to prove efficiency of winterization on an industrial scale of a mixture of crude Herring oil and a solubilizing agent natural Triglycerides (TG) as, and fully refine suitable for human consumption according to GOED standards (http://goedomega3.com/).

Winterization. The Winterization is Carried Out in Two Main Steps, Crystallization Step (cooling) and filtering step. It is very important to avoid that the oil fully solidifies during the crystallization step. Mainly saturated and long chain monounsaturated fatty acids (together referred to as stearin) but inevitably also other fatty acids will be removed together with the separation of the stearin.
  a. Crystallization. Crystallization was performed by first measuring so-called slip melting point (smp) of the crude oil and then applying suitable standard automated curve consisting of several cooling steps (FIG. 14) of the crystallization unit. For example, 10-12° C. for the first batch and gradually for each winterization batch the final temperature of the crude oil to be filtered is lowered to a point where the filtration is performed, according to previous experiments performed on lab scale by Margildi. The cooling process was always performed automatically overnight according to chosen appropriate cooling steps (curve) chosen according to measured slip melting point (smp) of the crude oil in the crystallization tank.
  b. Filtration. Filtration is done through industrial scale press filter, with adjustable filtration parameters such as inlet feed pressure, squeezing pressure.
  c. Processing steps a and b should be repeated with gradually lowered temperatures until the olein fraction is non-destearinated and passes so-called 3 hour cold test at 0° C. (AOCS Official Method: Cc 11-53. "Cold Test").
  d. Non-destearinated test (cold-test) should be carried out after winterization according to standards. After 3 hour storage in 0° C. the fish oil must be clear without any stearin (crystallized fatty acids).

Execution of Winterization with Crude Herring Oil

Winterization Batch 1

The crude oil was pumped from IBC to crystallization tank (reactor) (4 pcs. IBC lot nr. 150039, and 1 pcs. IBC from lot 140623). Slip melting point (smp) was measured as 14° C., the cooling curve (FIG. 14) used for the first round had a smp 20 with final temperature of 12° C. The oil was not fully crystallized so the final temperature could have been lower. The stearin was wet and the crystals were small, from the filtration were obtained 4000 L of olein out of the 6000 L of crude oil. The measured smp of the olein was 12° C. The cooling curve was defined by the smp 12° C. but the final temperature was set to 5° C. instead of 3° C. to be cautious and avoid possible solidification of the oil in the crystallization tank.

Winterization Batch 2

At 6° C. the oil was thick and lines between olein and sterin were visible in the crystallization tank. The filtration rate (flow into Filter press) was slow each time the Filter press was operated, only about 3% (approx. 160 L) of total volume of crystallization tank was filtered at each round, with final inlet pressure of 1.5 bar. But the filtration cake (stearin) was easier to handle than in step 1 thus it was relatively thin and a part of it was sticky on the filter cloths in the Filter press. After two hours of filtration the final inlet pressure was increased up to 2.0 bar to get more oil through the Filter press. Slip melting point test was taken both during filtration at 1.5 bar smp=7° C., and for 2.0 bar the smp=8° C. After 6.5 hours the filtration was stopped with only 2450 L of oil being filtrated. The rest of the oil was heated up for cleaning from the filter and new smp=11° C., of the rest of the oil from the tank was mixed with the olein obtained from the batch. Cooling curve smp 11 was used with lowered water temperature to increase cooling rate based on previous experience.

Winterization Batch 3

On day 2 the cooling process was stuck on step 4 (see FIG. 14) which is an improvement from previous batches. Samples of sterin and olein were sent for analysis of fatty acid profile. When the filtration started the filtration rate was the same as before in winterization batch 2. The final inlet pressure was increased to get more oil through the filter. At the end of the day, 625 L of sterin were filtered (separated) from the total mixture of crude Herring oil with 3150 L left in the tank. The smp of the rest was measured 8° C., crystallization followed curve for smp 8° C. with lowered water temperature.

Winterization Batch 4

In the morning of day 3, the cooling step was stuck on step 4 for three hours, the water temperature was lowered to speed up the cooling. Filtration was started with oil temperature of 1.0° C., with final inlet pressure of 1.3 bar and only about 3% of total volume of reactor tank filtered at a time, and the volume lowered in the next filtrations. The pressure was increased up to 1.5 bar but the olein did not withstand the non-destearinated test (cold test). The olein was taken and put on two drums, total volume about 400 L. The rest of the oil was mixed with 1.5 IBC from lot Lot 140623, and the smp of that mixture was smp=11° C., cooling curve according to that smp with final temperature of 3.0° C.

Winterization Batch 5

On day 4, the cooling process was almost at end of step 4, so the water temperature was lowered slightly to obtain preferred final temperature of crude oil ready for filtration. The filtration was started and the starting filtration pressure was lowered to 0.2 bar and the final pressure was set to 1.1 bar. With such low pressure the intention was to obtain good filtration to obtain olein that passes the 3 h cold test, but the first round of filtration was only 2.7% of crystallization tank volume. The amount of crude oil pumped through the Filter press decreased drastically in the next rounds of filtration. When the crude oil was filtered at 1.1 bar, the olein was measured having smp=4° C., the crude oil being smp=11° C. before filtration which is quite a good result With such a low filtering rate the method does not work on an industrial scale and the yield (mass losses of crude oil as stearin) doesn't make it as a feasible option. The total volume filtered during the day was little less than 500 L with olein yield about 60-62% without passing cold test Conclusion The conclusion of the first winterization trial consisting of these 5 winterization batches is that winterization of crude herring oil cannot be performed in a feasible way with traditional winterization equipment on industrial scale.

Execution of Winterization with Herring Oil Mixed with Cod Liver Oil (CLO)

Winterization Batch 1

On day 1, 3 pcs. IBC of each lot, 1503SVH01-04 and 1503HTC01-03, were pumped into the crystallization reactor with agitation to get an even mixture containing 50% crude herring oil and 50% crude cod liver oil, the smp was measured being 14° C., the cooling curve chosen was similar to smp 15° C. but water temperature in cooling steps 4 and 5 of the cooling curve was lowered by 1° C.

After crystallization the filtration was started on day 2, the start filtration pressure was set to 0.5 bar with 0.2 bar steps up to 1.2 bar final pressure. The filter cake (stearin) was relatively dry at the beginning, but soon the filtration rate fell dramatically. After 5 rounds of filtration with final pressure varying from 1.1 bar to 1.5 bar with no progression with about 15% of the reactor volume filtered, the filtration was stopped. After 6 rounds of filtration the decision was made to stop filtering and clean the filter with hot oil. When cleaning the filter according to manual process with 60° C. warm oil the flow rate was unusually low which supported by the idea that the filter cloths were completely clogged. Therefore the filter cloths were changed in the morning after, and the oil bleached to get rid of small pigments and phospholipids.

Winterization Batch 1.1

Before bleaching of the oil an increased volume of oil was needed due to loss in the bleaching process, therefore ca. 1400 L of the crude Herring of oil from first winterization trial was added to the existing 4660 L of the Herring and CLO mixture. Therefore the ratio of the mixture to be winterized consisted of Herring ca. 62% against 38% of CLO. The additional 1400 L of the Herring oil had been slightly winterized during the first winterization trial. The smp of the total mixture after bleaching was measured being 11° C. The starting volume in volume in crystallization tank was 99.7% which is ca. 5400 L. Crystallization was started overnight as earlier according to suitable cooling curve chosen according to measured smp of the crude oil mixture.

The filtration was started at final inlet pressure of 1.3 bar, with a good flow rate through the Filter press. Each time (round) the Filter press was operated it contained ca. 6% of total volume of the crystallization tank and a good flow in the upper line of the Filter press. The filtration took about 7 hours with 21 rounds with olein yield about 78% olein yield. The olein did withstand the cold test for 55 min so it was decided to perform second batch of winterization of the olein fraction.

Winterization Batch 1.2

The smp of the olein fraction was measured being 6° C. and appropriate cooling curve chosen according to standard smp 6 value for the crystallization unit with final cooling temperature of 0° C. (to be reached prior to filtration). Crystallization was started overnight as earlier according to suitable cooling curve chosen according to measured smp of the crude oil mixture as described earlier.

The day after the temperature of the crude oil mixture in the crystallization tank was 2.4° C. Filtration was started at crude oil temperature at 2.3° C. for the first round into the Filter press). The volume pumped through and into the Filter press was about 8.5% of total volume of the crystallization tank and the olein flow in the upper line of the Filter press was good. The volume filtered each round through the Filter press was ca. 5-7%, down to 3-4% at the end in total of 21 round with olein yield about 80% for this second batch.

Total olein yield for the winterization of the Herring-Cod liver oil (CLO) in two batches was about 59%.

Conclusion

The two main conclusions of these trials are, that winterization of sole crude Herring oil cannot be performed in a feasible way with traditional winterization/dry fractionation equipment and process. Our results show a very low yield (lower than 40%), and the olein (winterized oil) was far away from passing the 3 h cold test.

The winterization of crude Herring oil mixed with crude CLO can be performed with a total olein yield about 59%. The yield may be increased with process optimization in the future.

The invention claimed is:

1. A method of purifying a fish oil by winterization, the method comprising steps of:
   a) mixing a fish oil having a stearin content that is in the range of 2% (by weight) to 40% (by weight) with a solubilizing agent comprising an edible winterized fish oil to obtain a liquid mixture;
   b) incubating the liquid mixture at a first temperature that is in a range from +5° C. to +15° C.;
   c) filtering the mixture at a temperature that is equal to or lower than the first temperature to obtain a filtrate;
   d) incubating the filtrate obtained in step c) at a temperature that is lower than the temperature of steps b) and c);
   e) filtering the mixture from step d) at a temperature that is equal to or lower than the temperature in step d);
   f) optionally, performing additional incubating and filtering steps at increasingly lower temperatures, wherein each filtering step is performed at a temperature that is equal to or lower than the temperature of the previous incubation step; wherein the temperature of the last filtering step is in a range from −10° C. to +5° C., and wherein the solubilizing agent has a melting point that is lower than the temperature of the last filtering step;
   and g) isolating a liquid composition of the fish oil and the solubilizing agent that is suitable for human or animal consumption and that has a melting point lower than +5° C. in order to provide a composition of the fish oil after winterization that is a clear liquid without formation of stearin crystals following a cold test performed for a period of 1-3 hours at a temperature of 0° C.

2. The method of claim 1, wherein the fish oil in step a) has a stearin content in the range of 3% (by weight) to 20% (by weight).

3. The method of claim 1, wherein the temperature difference between two sequential incubation steps is in the range of 1° C. to 4° C.

4. The method of claim 1, wherein the first step of incubating and filtering is performed at a temperature that is in the range of 8° C. to 12° C.

5. The method of claim 1, wherein the temperature of the last filtering step is in the range of −5° C. to +2° C.

6. The method of claim 1, wherein the fish oil is selected from mackerel oil, horse mackerel oil, herring oil, sand eel oil and capelin oil.

7. The method of claim 1, wherein the solubilizing agent comprises from 10% to 90% by weight of at least one fatty acid.

8. The method of claim 1, wherein the ratio of fish oil to solubilizing agent ranges from 10:1 to 1:10 (weight:weight).

9. The method of claim 1, wherein the solubilizing agent has a melting point that is in the range from −70° C. to −10° C.

10. The method of claim 1, wherein the ratio of fish oil to solubilizing agent ranges from 5:1 to 1:5 (weight:weight).

11. The method of claim 1, wherein the ratio of fish oil to solubilizing agent ranges from 3:1 to 1:3 (weight:weight).

12. The method of claim 1, wherein the ratio of fish oil to solubilizing agent ranges from 2:1 to 1:2 (weight:weight).

13. The method of claim 1, wherein the solubilizing agent has a melting point that is in the range from −60° C. to −10° C.

14. The method of claim 1, wherein the solubilizing agent has a melting point that is in the range from −50° C. to −10° C.

15. The method of claim 1, wherein the fish oil in step a) has a stearin content in the range of 3% to 30% (by weight).

* * * * *